UNITED STATES PATENT OFFICE.

GEORGE M. LITTLE, OF PITTSBURGH, AND BENJAMIN J. GUDGE, OF WILKINSBURG, PENNSYLVANIA, ASSIGNORS TO WESTINGHOUSE ELECTRIC AND MANUFACTURING COMPANY, A CORPORATION OF PENNSYLVANIA.

PROCESS OF PREPARING ARC-LAMP ELECTRODES.

1,138,674.  Specification of Letters Patent.  Patented May 11, 1915.

Application filed April 21, 1910. Serial No. 556,880.

*To all whom it may concern:*

Be it known that we, GEORGE M. LITTLE and BENJAMIN J. GUDGE, citizens of the United States, and residents, respectively, of Pittsburgh and Wilkinsburg, both in the county of Allegheny and State of Pennsylvania, have invented a new and useful Improvement in Processes of Preparing Arc-Lamp Electrodes, of which the following is a specification.

Our invention relates to the preparation of arc lamp electrodes, and it has for its object to provide a process of treatment which will produce straight and compact finished electrodes of uniform texture and size.

Figure 1:
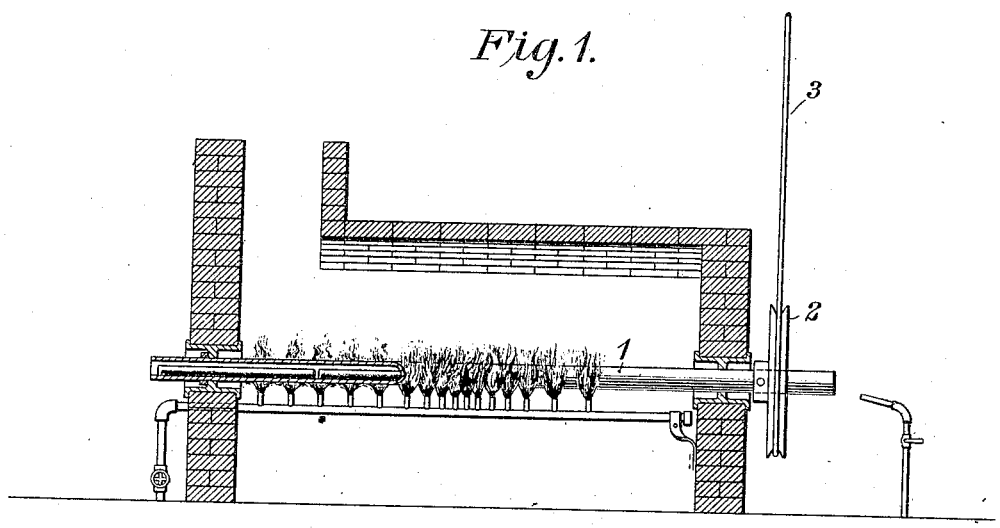
Figure 2:

Figure 1 of the accompanying drawing is a side view of an oven that is employed in practising our invention, and Fig. 2 represents a finished electrode.

While the invention is not limited, in its application, to electrodes of any specific composition, it is intended primarily for the treatment of electrodes containing one or more metallic oxids, such as magnetic oxid of iron, titanium oxid, and chromium oxid, which electrodes have heretofore been prepared by mixing the constituents in a dry, powdered condition, and then packing them in iron tubes.

For the purpose of practising the present invention, the electrode composition is somewhat different from those that have heretofore been employed, the change being made in order to adapt the composition to be pressed or squirted through dies, or to be otherwise molded, and to render the finished electrodes strong and durable without the use of iron containing tubes for the mixed materials.

A suitable composition is approximately as follows: 60 parts, by weight, of magnetic oxid of iron ($Fe_3O_4$), 27 parts of titanium oxid ($TiO_2$), 9 parts of ferrous chromite ($Cr_2O_3.FeO$), .5 parts of sodium fluorid (NaFl), 1 to 2 parts of starch, or of glucose, or of both, 1½ parts of boracic acid, a small quantity of summer oil or other suitable oil.

The magnetite, titanium oxid, ferrous chromite, sodium fluorid and boracic acid are first intimately mixed while in a dry powdered condition, and then the starch and glucose, in a water solution, which has been cooked until the white color has disappeared and the summer oil are added. After another thorough mixing of the ingredients, the composition is ready for pressing or squirting through dies, or for being otherwise molded.

After the electrodes are squirted or molded, they are baked and hardened by passing them through a furnace, or oven, a simple but suitable and practical form of which is illustrated in Fig. 1. The furnace comprises a confined chamber through which extends a tube 1 that is adapted to be rotated by means of a pulley 2, which receives power from any suitable source, through a belt 3. The tube 1 is heated within the furnace, during its rotation, by means of a series of gas flames, which are adjusted so that the left-hand end of the tube is black, the middle a bright red, and the right-hand end fades gradually from a bright red to a black.

The green or unbaked electrodes are fed into the left-hand end of the tube, and are moved through the tube at such a rate as to be gradually heated to a degree sufficient to carbonize the starch, and to sinter the remaining materials together. The electrodes are then gradually cooled, and are removed or discharged from the right-hand end after having been cooled sufficiently to become set. A blast of air is directed into the right-hand end of the tube, over and around the electrodes as they pass through the tube, and the carbonaceous gases that are given off during the baking process will be carried out of the tube at its entrance end, and will not be permitted to remain in the chamber where the electrodes are being baked and cooled, this being for the purpose of preventing the baking and cooling electrodes from absorbing any of the carbonaceous gases. The stream of air also provides oxygen for the substantially complete oxidation of the carbon in the electrode. As the tube 1 is somewhat larger in diameter than the electrodes, the latter will be rolled, while rendered soft and pliable by the heat, so that, irrespective of their condition when fed into the tube, they will be discharged from it in a straight condition, the rotating tube, of course, being of sufficient length to permit of cooling the electrodes to such a degree that they are no longer soft or pliable when they are discharged therefrom.

In order to improve the conductivity of the baked electrodes, they are preferably provided with iron cores, as by the insertion of iron rods or wires in axial longitudinal holes that are provided therein, a completed electrode of this character being shown in Fig. 2, though other suitable means may be employed, if desired, for effecting the same result.

The baking of the electrodes in a draft of air is regarded as an important step in the process of treatment, for the reason that the carbonaceous gases, that are given off during the baking, are thereby carried away and are prevented from being again absorbed into the electrodes, and the oxygen of the air oxidizes and removes substantially all of the carbon, it being desirable that electrodes of this character should contain but a very small percentage, or substantially no carbon. The process of treatment is novel in this respect, since electrodes have heretofore been baked in a carbonaceous atmosphere for the purpose of hardening them. If carbonaceous gases are absorbed into the electrodes, the electrodes will swell and will be materially larger than when in a green or unbaked condition, and they are, therefore, mechanically weaker, less compact and less uniform, both in texture and size, than when the carbonaceous gases are driven off gradually and are prevented from being again absorbed into them. It should be noted also that the starch is used only as a temporary binder for the other constituents of the mixture, and is used in the smallest practicable quantity in order that the finished electrodes may contain substantially no carbon, or at least not sufficient to render them objectionably brittle. It is used for binding together the other constituents of the electrodes only while they are in a green or unbaked condition, and for the purpose of facilitating the preliminary mechanical handling thereof. The baking of the electrodes carbonizes, oxidizes and drives out the starch and causes the other constituents to sinter or fuse together, and their own binding qualities are thereafter relied upon alone for permanently securing them together.

Another distinct advantage of the present process of treatment over other processes is, that it permits of the employment of a continuously operating furnace, it being obvious from the above description and from the illustration, that there need be no interruption of the baking operation.

It will, of course, be understood that the process is not limited to the treatment of electrodes having the specific composition that has been described, but that it is applicable generally to the treatment of electrodes of any desired and suitable composition. Also, that the means for practising the invention may be greatly modified from what is illustrated without departing from the spirit and scope of our invention.

We claim as our invention:

1. The process of preparing rod-like electrodes which consists in simultaneously baking and axially rotating them.

2. The process of preparing rod-like electrodes containing a volatile binder which consists in simultaneously baking and axially rotating them in air.

3. The process of preparing rod-like electrodes containing a volatile binder which consists in simultaneously baking and axially rotating them in a draft of air.

4. The process of preparing rod-like electrodes containing a volatile binder which consists in moving them into and out of a furnace, axially rotating them during such movement, and directing a draft of air upon them while disposed in the furnace.

5. The process of preparing electrodes which consists in simultaneously baking them, rotating them, and removing the carbonaceous gases that are liberated.

6. The process of preparing electrodes which consists in mixing titanic material with a temporary binder, driving out the binder, and sintering the titanic material while rotating the electrodes.

7. The process of preparing electrodes which consists in mixing titanic material with starch, driving out the starch, and sintering the titanic material while rotating the electrodes.

8. The process of preparing electrodes which consists in mixing titanic material with starch and baking the same while rotating the electrodes.

9. The process of preparing rod-like electrodes which consists in baking and axially rotating them while supported throughout their lengths.

10. The process of preparing rod-like electrodes containing a volatile binder which consists in simultaneously baking and axially rotating them in a draft of air while supported throughout their lengths.

In testimony whereof, we have hereunto subscribed our names this 14th day of April, 1910.

GEORGE M. LITTLE.
BENJAMIN J. GUDGE.

Witnesses:
OTTO S. SCHAIRER,
B. B. HINES.